United States Patent

Boyer

[11] Patent Number: 5,921,344
[45] Date of Patent: Jul. 13, 1999

[54] ELECTRIC STEERING SYSTEM

[75] Inventor: Michael J. Boyer, Lake Orion, Mich.

[73] Assignee: TRW Inc., Lyndhurst, Ohio

[21] Appl. No.: 08/868,191

[22] Filed: Jun. 3, 1997

[51] Int. Cl.[6] .................................................. B62D 5/04
[52] U.S. Cl. ......................................... 180/444; 180/443
[58] Field of Search .................................. 180/443, 444; 74/89.15, 459, 424.8 NA, 424.8 R, 388 PS

[56] References Cited

U.S. PATENT DOCUMENTS

| | | |
|---|---|---|
| 4,415,054 | 11/1983 | Drutchas . |
| 4,666,014 | 5/1987 | Carlson et al. . |
| 4,800,974 | 1/1989 | Wand et al. . |
| 5,295,407 | 3/1994 | Hirose et al. ............................ 74/459 |
| 5,437,349 | 8/1995 | Kurahashi et al. . |
| 5,590,732 | 1/1997 | Sugino et al. . |
| 5,685,390 | 11/1997 | Chikuma et al. ....................... 180/444 |
| 5,704,250 | 1/1998 | Black .................................... 74/424.8 |

*Primary Examiner*—Robert J. Oberleitner
*Assistant Examiner*—Michael Cuff
*Attorney, Agent, or Firm*—Tarolli, Sundheim, Covell, Tummino & Szabo

[57] ABSTRACT

A steering assembly (10) includes a housing (28, 60) and a member (14) which is movable axially in the housing to effect turning movement of steerable wheels of a vehicle. The member (14) has a rack portion (36) for engagement with a pinion (30) and an externally threaded screw portion (40). A ball nut (110) extends around the screw portion (40) of the member (14) and has an internal thread (116). A plurality of balls (200) are disposed between the internal thread (116) on the ball nut (110) and the external thread (40) on the member (14) for transmitting force between the ball nut and the screw portion of the member. An electric motor (50) for rotating the ball nut (110) includes a stator (70) and a rotor (80). A bearing assembly (150) supports the ball nut (110) for rotation relative to the housing, the bearing assembly including a plurality of bearings (152) disposed between first and second races (154, 156). The central radial plane (158) of the bearings (152) intersects the internal thread (116) of the ball nut (110). A first portion of the internal thread (116) on the ball nut (110) is disposed radially inward of the rotor (80) and the stator (70), and a second portion of the internal thread on the ball nut is disposed axially outward of the rotor and the stator.

14 Claims, 2 Drawing Sheets

ELECTRIC STEERING SYSTEM

BACKGROUND OF THE INVENTION

1. Technical Field

The present invention relates to a power assist steering system. In particular, the present invention relates to an electric power assist steering system which includes a ball nut for transmitting force between a steering member and an electric assist motor.

2. Description of the Prior

A known type of power assist steering system includes a ball nut for transmitting force between a steering member and an electric assist motor. Upon actuation of the electric motor, the ball nut is driven to rotate relative to the steering member. The rotational force of the ball nut is transmitted to the steering member to drive the steering member axially. Axial movement of the steering member effects turning movement of the steerable wheels of the vehicle.

In some known electric power assist steering systems, the ball nut is located inside the motor, that is, radially within the rotor and the stator. This arrangement tends to decrease the size of the rotor, thus reducing motor efficiency, unless the radial size of the motor is increased. In other known steering systems, the ball nut is located axially outside the motor. This arrangement tends to increase the length of the steering assembly, again undesirably.

SUMMARY OF THE INVENTION

The present invention is a steering assembly for turning steerable wheels of a vehicle in response to rotation of a steering wheel of the vehicle. The steering assembly comprises a housing and a member which is movable axially in the housing to effect turning movement of the steerable wheels of the vehicle. The member has a rack portion for engagement with a pinion and an externally threaded screw portion. A ball nut extends around the screw portion of the member and has an internal thread. A plurality of balls are disposed between the internal thread on the ball nut and the external thread on the member for transmitting force between the ball nut and the screw portion of the steering member.

The steering assembly includes an electric motor for rotating the ball nut, the electric motor including a stator and a rotor. A bearing assembly supports the ball nut for rotation relative to the housing, the bearing assembly comprising a plurality of bearings disposed intermediate first and second races. The central radial plane of the bearings intersects the internal thread of the ball nut. A first portion of the internal thread on the ball nut is disposed radially inward of the rotor and the stator, and a second portion of the internal thread on the ball nut is disposed axially outward of the rotor and the stator.

BRIEF DESCRIPTION OF THE DRAWING

The foregoing and other features of the present invention will become apparent to one skilled in the art to which the present invention relates upon consideration of the following description of the invention with reference to the accompanying drawings, wherein.

DESCRIPTION OF THE PREFERRED EMBODIMENTS

Figure 1:
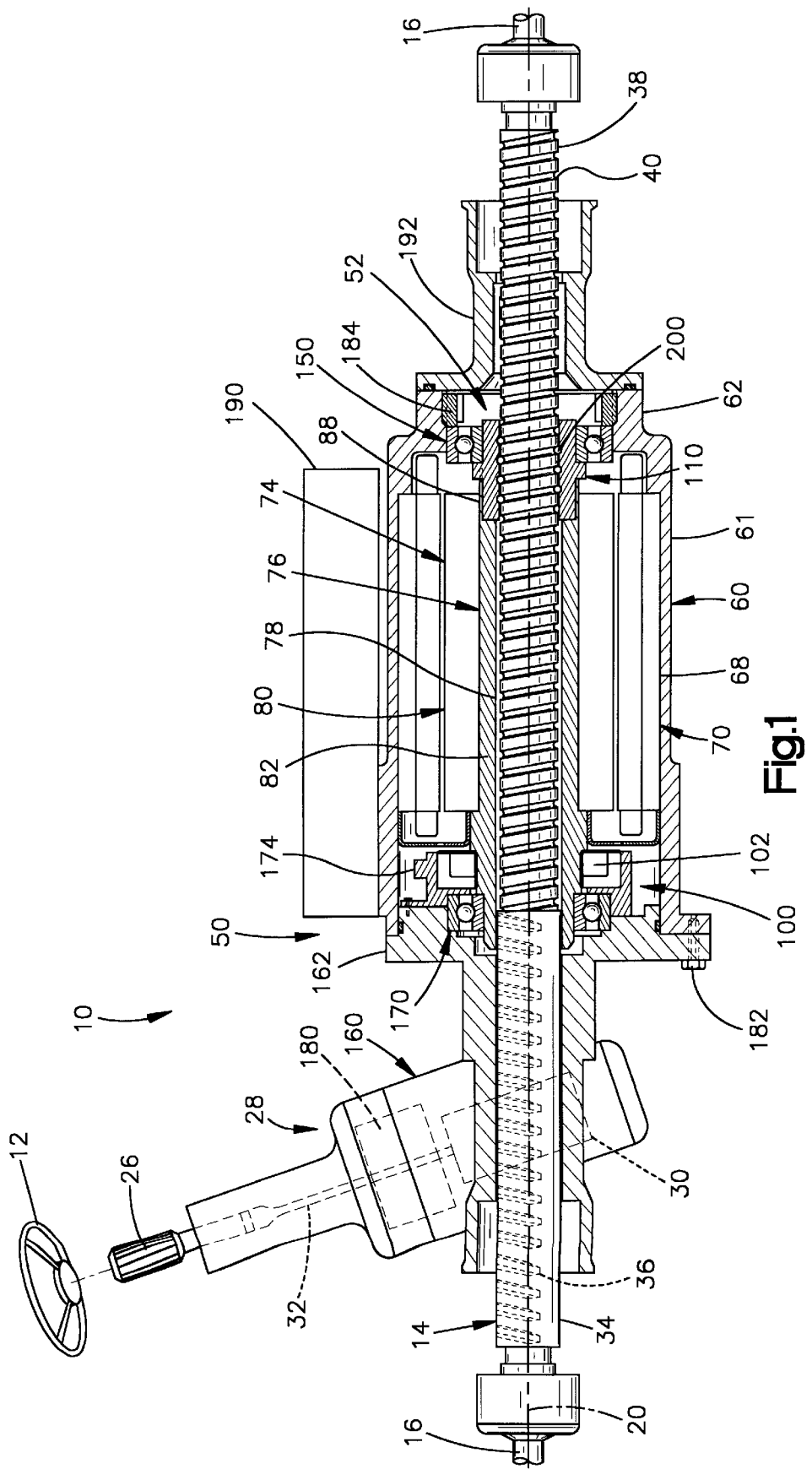
FIG. 1 is a view, partially in section, of a steering system in accordance with the present invention.

As representative of the present invention, FIG. 1 illustrates a power assist steering system 10 including a driver-operated steering wheel 12 operatively connected to a steering member 14. The steering member 14 is coupled with the steerable wheels (not shown) of a vehicle through tie rods 16. The steering member 14 extends along an axis 20 of the steering system 10.

The vehicle steering wheel 12 is connected for rotation with an input shaft 26 which extends into a pinion housing 28. The input shaft 26 is mechanically coupled by a torsion bar 32, in a known manner, to a pinion gear 30 located in the pinion housing 28.

The steering member 14 includes a first portion 34 having rack teeth 36 disposed thereon and a second portion 38 having an external screw thread convolution 40 axially spaced from the rack teeth. The rack teeth 36 on the steering member 14 are in meshing engagement with gear teeth (not shown) on the pinion gear 30.

The steering system 10 includes an electric assist motor 50, described below in detail, drivably connected to a ball nut assembly 52 (also described below in detail) for effecting axial movement of the steering member 14 upon rotation of the vehicle steering wheel 12. In the event of inability of the motor 50 to effect axial movement of the steering member 14, the mechanical connection between the gear teeth on the pinion gear 30 and the rack teeth 36 on the steering member 14 can effect manual steering of the vehicle.

The motor 50 includes a motor tube 60 which houses the other components of the motor. The motor tube 60 and the pinion housing 28, together, form a housing of the steering assembly 10. The motor tube 60 has a generally cylindrical configuration including an axially extending side wall 61 centered on the axis 20. A radially thickened portion 62 of the motor tube 60 is disposed at the right end (as viewed in FIG. 2) of the motor tube. The radially thickened portion 62 of the motor tube 60 has an annular inner surface 64 (FIG. 2) which extends parallel to the axis 20. An internal thread 66 is formed on a portion of the inner surface 64.

The motor tube 60 (FIG. 1) defines a chamber 68. A stator coil assembly or stator 70 is disposed in the chamber 68 in the motor tube 60. The stator 70 is press fit inside the motor tube 60. The stator 70 is energizable by an electric current over lead wires (not shown), in a known manner, to generate a magnetic field for effecting operation of the motor 50.

A rotor assembly 74 is disposed radially inward of the stator 70. The rotor assembly 74 includes a tubular, cylindrical rotor shaft 76 having a cylindrical central opening 78. A rotor 80 is press fit on the outside of the rotor shaft 76. Upon energization of the motor 50, the rotor is driven to rotate about the axis 20, in a known manner.

Figure 2:
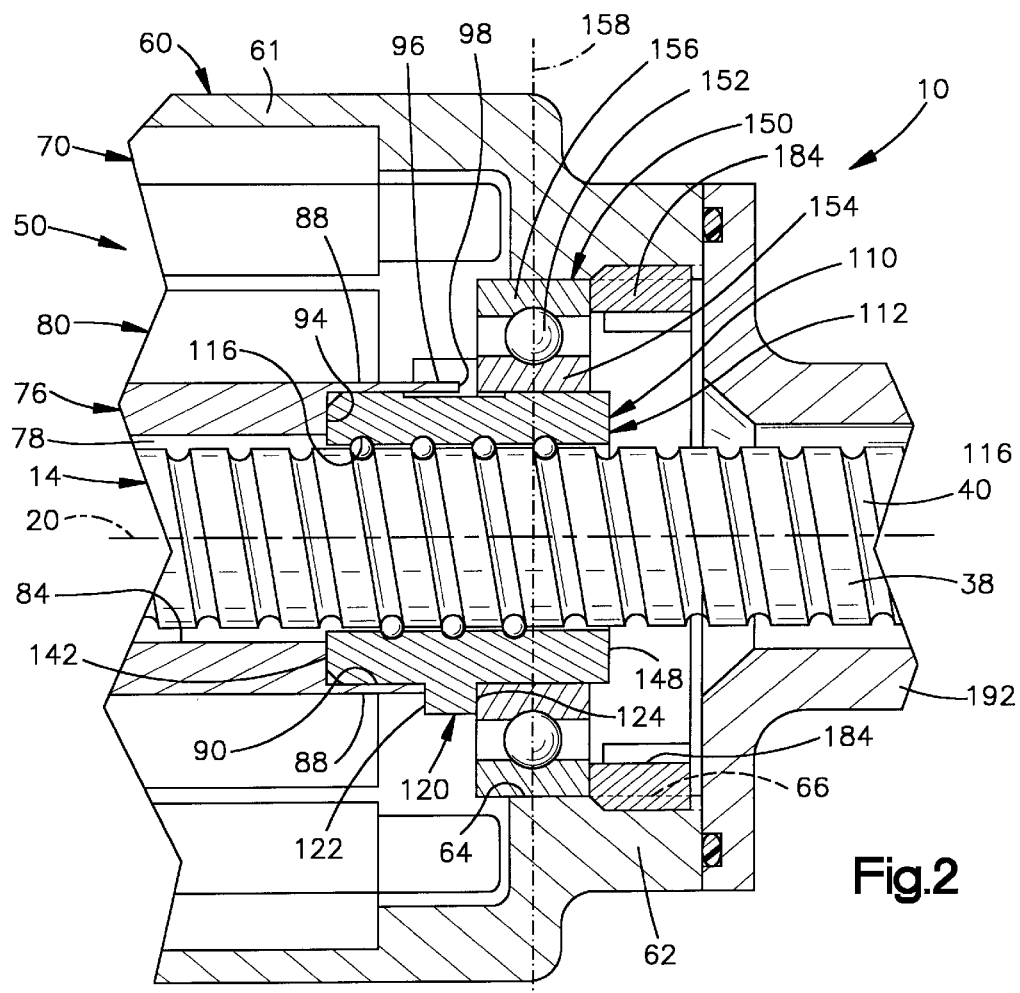
FIG. 2 is an enlarged view of a portion of the steering system of FIG. 1.

The rotor shaft 76 has a main body portion 82 and a thin-walled right end portion 88 with a cylindrical, axially extending inner side surface 90 (FIG. 2). The inner diameter of the right end portion 88 is greater than the inner diameter of the main body portion 82 of the rotor shaft 76. An annular shoulder surface 94 on the rotor shaft 76 extends radially between an inner side surface 84 of the main body portion 82 of the rotor shaft 76 and the inner side surface 90 of the right end portion 88 of the rotor shaft.

The rotor shaft 76 includes a single tang 96 (FIGS. 2 and 3) which extends axially outward as an extension of the thin-walled end portion 88 of the rotor shaft. The tang 96 has a circumferential extent of about 15° around the axis 20. The tang 96 has a radially extending end surface 98.

The motor 50 includes a motor position sensor indicated schematically at 100 (FIG. 1). The motor position sensor 100 includes a position sensor rotor 102 press fit on the left end (as viewed in FIG. 1) of the rotor shaft 76.

The ball nut assembly 52 (FIGS. 1–3) includes a ball nut 110 which is press fit inside the right end portion 88 of the rotor shaft 76. The ball nut 110 has a generally cylindrical main body portion 112. A screw thread convolution 116 is formed on a cylindrical inner surface 114 of the ball nut 110.

A shoulder 120 extends radially outward from the main body portion 112 of the ball nut 110. The shoulder 120 has annular, radially extending end surfaces 122 and 124 and a cylindrical, axially extending outer side surface 126.

Figure 3:
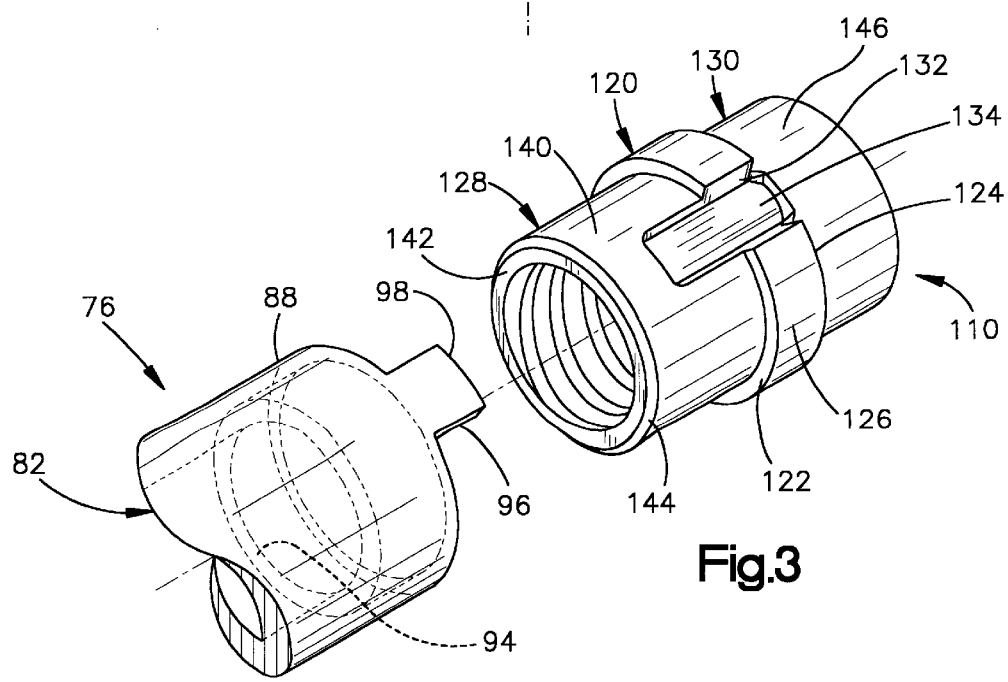
FIG. 3 is an exploded perspective view of parts of the steering system of FIG. 1.

A 15° circumferential portion of the shoulder 120 of the ball nut 110 is cut away to form a notch 132 (FIG. 3). A shallow keyway-type slot 134 on the outer peripheral surface of the main body portion 112 of the ball nut 110 creates an undercut which extends axially past the notch 132 in the shoulder 130.

The shoulder 120 of the ball nut 110 is disposed between first and second end portions 128 and 130 (FIG. 3) of the ball nut. The first end portion 128 of the ball nut 110 has a cylindrical outer surface 140 which extends parallel to the axis 20 and an annular, radially extending end surface 142. The outer diameter of the first end portion 128 of the ball nut 110 is chamfered at 144. The second end portion 130 of the ball nut 110 has a cylindrical outer surface 146 which extends parallel to the axis 20 and an annular, radially extending end surface 148.

The ball nut 110 is pressed into the rotor shaft 76 so that the outer surface 140 of the first end portion 128 of the ball nut has an interference fit, or press fit, with the cylindrical inner surface 90 of the right end portion 88 of the rotor shaft. The ball nut 110 is thus fixed for rotation with the rotor shaft 76. The radially extending end surface 142 of the first end portion 128 of the ball nut 110 abuttingly engages the radially extending shoulder surface 94 on the rotor shaft 76.

The tang 96 on the rotor shaft 76 fits into the notch 132 in the shoulder 120 of the ball nut 110. There is no axial engagement between the ball nut 110 and the end surface 98 of the tang 96 of the rotor shaft 76. There may be a small or no circumferential gap between the tang 96 and the shoulder 120 of the ball nut 110, to allow for backup rotational force transmission between the ball nut and the rotor shaft 76.

A first bearing 150 is press fit onto the second end portion 130 of the ball nut 110, against the shoulder 120 of the ball nut. The first bearing 150 includes a plurality of individual bearing elements 152 disposed between inner and outer races 154 and 156 of the bearing. The inner race 154 of the first bearing 150 engages the outer peripheral surface 146 of the second end portion 130 of the ball nut 110 in a radial force-transmitting relationship. The inner race 154 of the first bearing 150 engages the outer end surface 124 of the shoulder 120 of the ball nut 110 in an axial force-transmitting relationship. The first bearing 150 may preferably be an angular contact bearing, such as a tapered roller bearing or other type of bearing capable of carrying axial (thrust) loads as well as radial loads.

During the process of assembling the motor 50, the rotor shaft 76 and the other parts which are rotatable with it, including the rotor 80, the ball nut 110, the first bearing 150, and the motor position sensor rotor 102, is slipped into the assembly of the motor tube 60 and the stator 70. The outer race 156 of the first bearing 150 engages the inner peripheral surface 64 of the radially thickened portion 62 of the motor tube 60 in a radial force-transmitting relationship. The motor tube 60 and the first bearing 150 thus support the right hand end of the rotor assembly 74 for rotation relative to the stator 70. The central radial plane 158 of the first bearing 150 intersects the internal thread 116 of the ball nut 110. At this point in the manufacture of the steering assembly 10, the first bearing 150 is not supported axially in the motor tube 60.

The opposite end (the left end as viewed in FIG. 1) of the rotor assembly 74 is supported, in a manner described below, by the pinion housing 28. The pinion housing 28 includes a cast metal main body portion 160 which receives the pinion gear 30 and through which the rack portion 34 of the steering member 14 extends. The main body portion 160 of the pinion housing 28 has an extension portion 162 for connection with the motor tube 60.

A second bearing 170 is pressed into the extension portion 162 of the pinion housing 28. The second bearing 170 is similar in construction to the first bearing 150. The outer race of the second bearing 170 engages the extension portion 162 of the main body portion 160 of the pinion housing 28. The second bearing 170 is supported both radially and axially in the main body portion 160 of the pinion housing 28.

A motor position sensor stator 174 is secured to the pinion housing 28 outward of the second bearing 170. The motor position sensor stator 174 cooperates with the motor position sensor rotor 102, in a known manner, to help control operation of the motor 50.

A torque sensor 180 indicated schematically is located in the pinion housing 28. The torque sensor 180 is operative to sense relative movement between the input shaft 26 and the pinion gear 30, to help control operation of the motor 50, in a known manner.

The assembly of the pinion housing 28 and its attached parts is fastened to the motor assembly including the stator 70, the rotor 80, and the ball nut 110. The pinion housing 28 is fastened directly to the motor tube 60. A circular array of bolts, one of which is illustrated at 182, secures the pinion housing 28 to the motor tube 60.

A spanner nut 184 is then screwed into the thread convolution 66 at the open end of the motor tube 60 (the right end as viewed in FIG. 1). The spanner nut 184 is tightened down axially against the outer race 156 of the first bearing 150. The engagement between the spanner nut 184 and the outer race 156 of the first bearing 150 places an axial load on the first bearing. The axial load on the first bearing 150 is transmitted through the inner race 154 of the first bearing to the shoulder 120 of the ball nut 110. The first bearing 150 biases the ball nut 110 axially in a direction toward the second bearing 170.

The axial load on the ball nut 110 is transmitted through the end surface 142 on the first end portion 128 of the ball nut into the shoulder surface 94 on the rotor shaft 76. The axial load on the rotor shaft 76 is transmitted into the inner race of the second bearing 170.

The axial load on the inner race of the second bearing 170 is transmitted through the outer race of the second bearing to the extension portion 162 of the pinion housing 28. The second bearing 170 supports the left end of the rotor assembly 74 for rotation relative to the stator 70. The rotor assembly 74, at this point in the manufacture of the steering assembly 10, can now be turned relative to the stator 70.

The first and second bearings 150 and 170, together, support all the rotating parts of the motor 50. No other bearings, such as separate thrust bearings, are needed. Further, no housing (structural) parts, other than the motor tube 60 and the pinion housing 28, are needed to provide support for the bearings 150 and 170. For example, no separate end bells are needed, as is common in some electric steer motor designs.

In subsequent steps of manufacture of the steering assembly 10, an ECU (electronic control unit) indicated schematically at 190 is fastened to the motor 50. The stator 70, the torque sensor 180, and the motor position sensor 100 are electrically connected to the ECU 190. An outboard housing 192 closes the right end (as viewed in FIG. 1) of the motor 50.

The steering member 14 is inserted into the central opening 78 of the rotor shaft 76 of the motor 50. The ball nut assembly 52 extends around the screw portion 38 of the steering member 14. The ball nut assembly 52 includes a plurality of force-transmitting members in the form of balls 200 disposed between the internal thread 116 on the ball nut 110 and the external thread 40 on the screw portion 38 of the steering member 14. The balls 200 are loaded into the ball nut assembly 52 in a known manner. The ball nut 110 includes a recirculation passage (not shown) for recirculating the balls 200 upon axial movement of the steering member 14 relative to the ball nut.

Upon rotation of the vehicle steering wheel 12 by the driver of the vehicle, the vehicle electric circuitry, including the ECU 190 and the torque sensor 180, determines whether the motor 50 should be operated to provide steering assist to move the steering member 14. If the motor 50 is operated, the rotor 80 is caused to rotate about the axis 20 relative to the stator 70. The rotor shaft 76 and the ball nut 110 rotate with the rotor. The balls 200 transmit the rotational force of the ball nut 110 to the screw portion 38 of the steering member 14. Because the ball nut 110 is fixed in position axially, the steering member 14 is driven to move axially in response, effecting steering movement of the steerable wheels of the vehicle as desired.

In the steering assembly 10, the ball nut 110, as can be seen from FIGS. 1 and 2, is located partially in the motor 50 and partially out of the motor. Specifically, at least a part of the first end portion 128 of the ball nut 110, including a portion of the internal thread 116, is disposed radially inward of the rotor 80 and the stator 70. Because a part of the ball nut is disposed radially inward of the rotor 80 and the stator 70, the axial length of the steering assembly 10 is reduced, as compared to a steering assembly in which the ball nut is disposed completely outside the motor.

The remainder of the ball nut 110 (including the radially projecting shoulder 120 and a portion of the internal thread 116) is disposed axially outward (not radially inward) of the rotor 80 and the stator 70. As a result, the radial thickness of the rotor 80 can be increased because the ball nut 110 does not extend within the motor 50 for most of the length of the rotor. This motor configuration can increase the efficiency of the motor 50, as compared to a steering assembly in which the ball nut is disposed completely within the motor and which has a radially smaller rotor.

From the above description of the invention, those skilled in the art will perceive improvements, changes and modifications in the invention. Such improvements, changes and modifications within the skill of the art are intended to be covered by the appended claims.

Having described the invention, I claim:

1. A steering assembly for turning steerable wheels of a vehicle in response to rotation of a steering wheel of the vehicle, said steering assembly comprising:

a housing;

a member which is movable axially in said housing to effect turning movement of the steerable wheels of the vehicle, said member having a rack portion for engagement with a pinion and an externally threaded screw portion;

a ball nut extending around said screw portion of said member and having an internal thread;

a plurality of balls disposed between said internal thread on said ball nut and said external thread on said member for transmitting force between said ball nut and said screw portion of said member;

an electric motor for rotating said ball nut, said electric motor including a stator and a rotor; and a bearing assembly supporting said ball nut for rotation relative to said housing, said bearing assembly comprising a plurality of bearings disposed between inner and outer second races, the central radial plane of said bearings intersecting said internal thread of said ball nut;

a first portion of said ball nut being disposed radially inward of said rotor and said stator, and a second portion of said ball nut being disposed axially outward of said rotor and said stator;

said rotor being disposed on the outside of a cylindrical rotor shaft having a central opening through which said member extends;

said ball nut being fixed to an end portion of said rotor shaft and engaging an annular shoulder surface on said rotor shaft to transmit axial force between said ball nut and said rotor shaft, said first portion of said internal thread on said ball nut being disposed inside said rotor shaft.

2. A steering assembly for turning steerable wheels of a vehicle in response to rotation of a steering wheel of the vehicle, said steering assembly comprising:

a housing;

a member which is movable axially in said housing to effect turning movement of the steerable wheels of the vehicle, said member having a rack portion for engagement with a pinion and an externally threaded screw portion;

a ball nut extending around said screw portion of said member and having an internal thread;

a plurality of balls disposed between said internal thread on said ball nut and said external thread on said member for transmitting force between said ball nut and said screw portion of said member;

an electric motor for rotating said ball nut, said electric motor including a stator and a rotor; and a bearing assembly supporting said ball nut for rotation relative to said housing, said bearing assembly comprising a plurality of bearings disposed between inner and outer second races, the central radial plane of said bearings intersecting said internal thread of said ball nut;

a first portion of said ball nut being disposed radially inward of said rotor and said stator, and a second portion of said ball nut being disposed axially outward of said rotor and said stator;

a first portion of said internal thread on said ball nut being disposed radially inward of said rotor and said stator and a second portion of said internal thread on said ball nut being disposed axially outward of said rotor and said stator.

3. A steering assembly for turning steerable wheels of a vehicle in response to rotation of a steering wheel of the vehicle, said steering assembly comprising:

a housing;

a member which is movable axially in said housing to effect turning movement of the steerable wheels of the vehicle, said member having a rack portion for engagement with a pinion and an externally threaded screw portion;

a ball nut extending around said screw portion of said member and having an internal thread;

a plurality of balls disposed between said internal thread on said ball nut and said external thread on said member for transmitting force between said ball nut and said screw portion of said member;

an electric motor for rotating said ball nut, said electric motor including a stator and a rotor; and a bearing assembly supporting said ball nut for rotation relative to said housing, said bearing assembly comprising a plurality of bearings disposed between inner and outer races, the central radial plane of said bearings intersecting said internal thread of said ball nut;

a first portion of said ball nut being disposed radially inward of said rotor and said stator, and a second portion of said ball nut being disposed axially outward of said rotor and said stator;

said motor including a motor tube which has a generally cylindrical configuration including an axially extending side wall, said stator being secured in said motor tube;

said motor tube having an inner surface on which an internal thread is formed, said steering assembly including a nut screwed into engagement with said motor tube and placing an axial load on said bearing assembly which is transmitted through said bearing assembly to said ball nut.

4. A steering assembly for turning steerable wheels of a vehicle in response to rotation of a steering wheel of the vehicle, said steering assembly comprising:

a housing including a motor tube and a pinion housing;

a pinion in said pinion housing;

a member which is movable axially in said housing to effect turning movement of the steerable wheels of the vehicle, said member having a rack portion for engagement with said pinion and an externally threaded screw portion;

an internally threaded ball nut extending around said screw portion of said member;

a plurality of balls disposed between said ball nut and said screw portion of said member for transmitting force between said ball nut and said screw portion of said member;

an electric motor for rotating said ball nut, said electric motor comprising a stator fixed in said motor tube and a rotor fixed for rotation with said ball nut;

said rotor being rotatable in response to rotation of the vehicle steering wheel to rotate said ball nut relative to said screw portion of said member to effect axial movement of said member;

a first bearing at a first axial end of said motor and supporting said ball nut and a first end of said rotor for rotation relative to said stator, said first bearing being supported radially and axially in said motor tube;

a second bearing at a second axial end of said motor and supporting a second end of said rotor for rotation relative to said stator, said second bearing being supported radially and axially in said pinion housing; and a nut screwed into engagement with said motor tube placing an axial load on said first bearing, the axial load on said first bearing being transmitted through said first bearing to said ball nut, said first bearing biasing said ball nut axially in a direction toward said second bearing.

5. A steering assembly as set forth in claim 4 wherein the axial load on said ball nut is transmitted through said ball nut into a rotor shaft and thence into said second bearing assembly, and the axial load on said second bearing is transmitted into said pinion housing.

6. A steering assembly for turning steerable wheel of a vehicle in response to rotation of a steering wheel of the vehicle, said steering assembly comprising:

a housing;

a member which is movable axially in said housing to effect turning movement of the steerable wheels of the vehicle, said member having a rack portion for engagement with a pinion and an externally threaded screw portion;

a ball nut extending around said screw portion of said member, said ball nut having a main body portion and oppositely disposed first and second end portions, said ball nut including an internal thread extending through said main body portion and through said end portions, said main body portion including a radially extending shoulder;

a plurality of balls disposed between said internal thread on said ball nut and said external thread on said member for transmitting force between said ball nut and said screw portion of said member;

an electric motor for rotating said ball nut, said electric motor including an axially extending stator and a axially extending rotor;

said rotor and said stator being disposed radially outward of said first end portion of said ball nut and axially overlying said first end portion, said second end portion of said ball nut being disposed axially outward of said rotor and said stator; and a bearing assembly supporting said ball nut for rotation relative to said housing, said bearing assembly being disposed radially outward of said ball nut and extending axially up to but not beyond one end of said ball nut, said bearing assembly comprising a plurality of bearings disposed between inner and outer races, the central radial plane of said bearings intersecting said internal thread in said second end portion of said ball nut, said inner race of said bearing assembly engaging said main body portion of said ball nut and said second end portion of said ball nut in a radial force-transmitting relationship, said inner race of said bearing assembly further engaging said shoulder on said ball nut in an axial force-transmitting relationship.

7. A steering assembly as set forth in claim 6 wherein said rotor is disposed on the outside of a cylindrical rotor shaft having a central opening through which said member extends.

8. A steering assembly as set forth in claim 6 wherein said ball nut is press fit in an end portion of a rotor shaft of said motor.

9. A steering assembly as set forth in claim 6 wherein said motor includes a motor tube which has a generally cylindrical configuration including an axially extending side wall, said stator being secured in said motor tube.

10. A steering assembly as set forth in claim 6 further including a pinion housing and a second bearing assembly which is supported both radially and axially by said pinion housing.

11. A steering assembly for turning steerable wheels of a vehicle in response to rotation of a steering wheel of the vehicle, said steering assembly comprising:

a housing including a motor tube and a pinion housing;

a pinion in said pinion housing;

a member which is movable axially in said housing to effect turning movement of steerable wheels of the vehicle, said member having a rack portion for engagement with said pinion and an externally threaded screw portion;

an internally threaded ball nut extending around said screw portion of said member;

a plurality of balls disposed between said ball nut and said screw portion of said member for transmitting force between said ball nut and said screw portion of said member;

an electric motor for rotating said ball nut comprising a stator fixed in said motor tube and a rotor fixed for rotation with said ball nut;

said rotor being rotatable in response to rotation of said vehicle steering wheel to rotate said ball nut relative to said screw portion of said member to effect axial movement of said member;

a first bearing at a first axial end of said motor supporting said ball nut and a first end of said rotor for rotation relative to said stator, said first bearing being supported radially and axially in said motor tube, said first bearing engaging a radially extending surface on said ball nut in a radial force transmission relationship and engaging an axially extending surface on said ball nut in axial force transmitting relationship; and a second bearing at a second axial end of said motor supporting a second end of said rotor for rotation relative to said stator, said second bearing being supported radially and axially in said pinion housing.

12. A steering assembly as set forth in claim 11 wherein said first bearing assembly biases said ball nut axially in a direction toward said second bearing.

13. A steering assembly as set forth in claim 11 wherein said pinion housing is fastened directly to said motor tube.

14. A steering assembly as set forth in claim 11 wherein said first and second bearing assemblies together support all rotating parts of said motor.

* * * * *